Sept. 9, 1958                P. TARDIEU                2,851,350
           PROCESS FOR PRODUCING TITANIUM ENRICHED SLAG
                         Filed Oct. 31, 1956
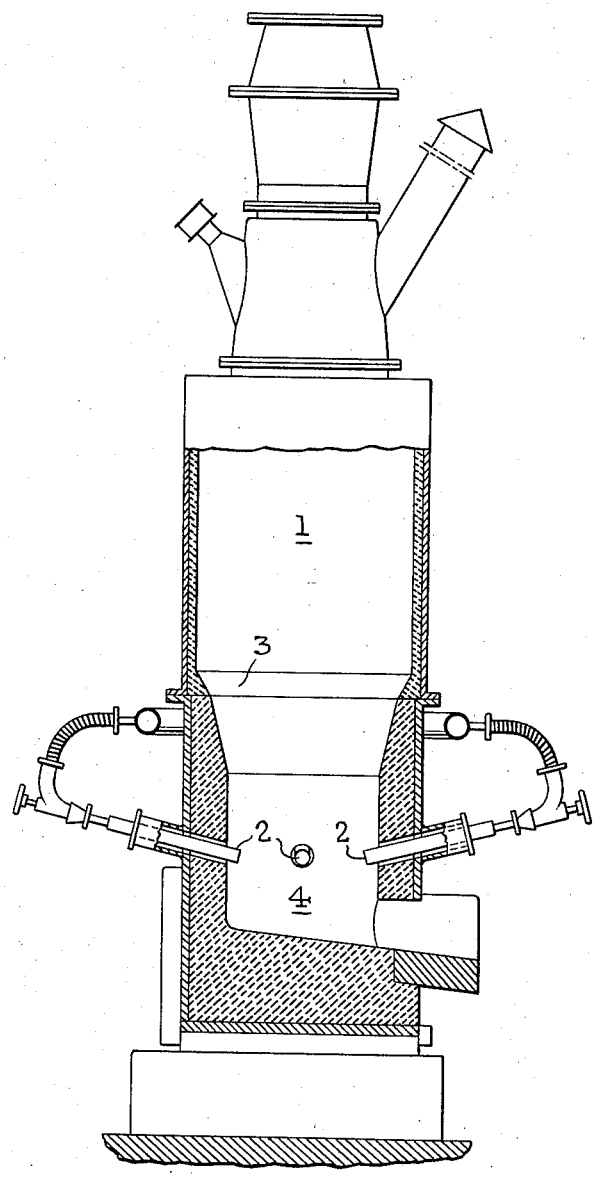
INVENTOR
Pierre Tardieu
BY
ATTORNEY

2,851,350

PROCESS FOR PRODUCING TITANIUM ENRICHED SLAG

Pierre Tardieu, Edea, Cameroons, assignor to Pechiney, Compagnie de Produits Chimiques et Electrometallurgiques, Paris, France, a corporation of France Application October 31, 1956, Serial No. 627,718

Claims priority, application France November 10, 1955

13 Claims. (Cl. 75—30)

The present invention, which results from applicant's investigations, concerns a new process for enriching ores containing titanium oxide with this compound. It relates more particularly to the treatment of ores such as ilmenite and rutile. The invention also relates to apparatus adapted for carrying out the new process.

A known method, currently used for enrichment (concentration) of ilmenite, consists in reducing the iron oxides contained therein and, thereafter, separating the iron from the titanium oxide-containing slag.

The reduction is generally carried out with coal or coke which is reacted at temperatures up to 1700° C.; the formed cast iron is separated in the liquid state and, more often than not, the slag is liquefied by means of various fluxes. For example, a known process consists in carrying out this invention in an electric furnace. However, the known processes do not make it possible to obtain slags which are very rich in $TiO_2$; there always remains in the slag a considerable proportion of iron oxide, fluxes, or oxides such as magnesia, lime, silica, alumina, etc.

In contrast with the foregoing, the present invention makes it possible to increase the concentration of titanium oxide to a very high degree, generally well above 75%, under economical conditions and, moreover, it enables, if necessary, to obtain a product which is free from CaO, MgO, $Al_2O_3$ and $SiO_2$, or a product which contains only very low proportions of these impurities.

The invention consists, essentially, in first subjecting a mixture of $TiO_2$-containing ore with carbon to prolonged heating between 400° C. and 1300° C., in maintaining it thereafter for a short period of time at a higher temperature, comprised between 1300° C. and 2500° C., and in finally maintaining it at a temperature comprised between 1200° C. and 2000° C. for a period of time sufficient for the separation of the formed cast iron.

The operations, according to the process of the invention, can be carried out in the presence of a flux, such as CaO, MgO, $SiO_2$, $Al_2O_3$, $Na_2O$, etc.; and mixtures of these different oxides. The temperatures and duration of the different steps of the above described operating cycle can be varied, depending upon the nature of the flux employed and the desired degree of concentration of the $TiO_2$.

According to another feature of the invention, the heating—and particularly the short-time heating to the highest temperature—is preferably carried out in the presence of a gas current flowing through the reaction mass; the effect of passing a gas at a high temperature is to promote the volatilization of impurities such as CaO, MgO, $Al_2O_3$, $SiO_2$, etc., thus enabling a purer product to be obtained.

The temperatures most frequently used in the application of the new process are: 600° to 1200° C. during the initial heating period of longest duration, 1800° to 2200° C. during the short-time (quick) heating, and 1300° to 1800° C. during the final period during which the separation of the slag from the cast iron takes place.

Depending upon the temperatures chosen for the operation, the respective durations of the three heating periods can vary, but they are generally comprised between 1 and 8 hours for the first of these periods, between 10 and 45 minutes for the second, and from 30 minutes to 2 hours for the third period.

The process of the invention gives particularly attractive results when using a flux having as essential components alkali compounds such as, for example, $Na_2O$, $Na_2CO_3$, etc. Under these conditions, it is possible to operate at temperatures close to the lower limits of those set forth above and the titanium oxide, separated as a liquid slag, can be obtained free of lime or magnesia admixtures (additions); this is particularly advantageous when the manufactured product is intended for the production of titanium chloride, since alkaline-earth compounds are detrimental in the chlorination of titanium oxide.

Another advantage of the process of the invention resides in that it becomes possible to liquefy the titaneferous slag by means of slight proportions of an alkali flux; these proportions can be far lower than those which would be required for transforming the titanium oxide present into alkali titanate.

Various apparatus can be employed for carrying out the described process. For example, according to one embodiment of the invention, the heating of a mixture of ilmenite and coke or coal is carried out in a rotating furnace adapted to provide the sequence of temperatures above specified. The operation can be carried out without flux, and there is then recovered—at the furnace outlet—on the one hand cast iron and, on the other hand, a solid or pasty slag enriched in titanium oxide. By suitably controlling the ratio of carbon in the initial mixture, either the iron oxides alone are reduced, or else the $TiO_2$ of the ore is also partially reduced. With a larger ratio of carbon, not only can $TiO_2$ be reduced to titanium sub-oxides, but titanium carbide can be obtained in addition; under these circumstances, the slag separated from the cast iron leaving the furnace can be entirely solid and even pulverulent.

A rotating furnace can likewise be employed for working with fluxes, in which case liquid cast iron and slag are obtained at the furnace outlet, the temperatures being so controlled that the slag leaves the furnace in the liquid state.

Remarkable results have been obtained by carrying out the new process in a shaft furnace. More particularly, a slag containing 90% $TiO_2$ has been obtained starting from ilmenites containing 33.4% FeO and about 55% $TiO_2$. In fact, by carrying out the new process in a shaft furnace of the low-stack-blast-furnace type blown with air enriched in oxygen, there are obtained numerous advantages, the principal of which are: obtainment of very high temperatures with a rather short zone making possible the volatilization of impurities, very rapid reduction in this restricted zone of high temperatures due to the direct action of solid carbon, and the possibility of using alkali fluxes which, in the case of electric furnaces, have known disadvantages. Another advantage resides in the high thermal efficiency by reason of the recovery of the produced gases.

In order to illustrate the invention, there is described by way of example only, and without limitation, an embodiment of the new process as carried out in a shaft furnace of the low-stack-blast-furnace type. The annexed single figure illustrates a partial, vertical section of such a furnace.

The furnace used in carrying out the operation comprised a shaft 1 having a height of 4 m. and a diameter of 1.16 m. at its belly 3; the depth of the crucible 4 measured between the plane of the tuyeres 2 and the hearth was 0.5 m.; the walls of the crucible 4 were 0.7 m. thick, and those of the hearth 0.9 m. In this furnace, blown with air containing 35% oxygen, there were produced daily about 10 tons of slag enriched with titanium oxide. The hourly charge comprised 280 kg. coke, 800 kg. Senegal ilmenite, 60 kg. sodium carbonate and 800 cubic meters air having a 35% oxygen content.

The treated ilmenite had the following composition:

|  | Percent |
|---|---|
| $TiO_2$ | 55 to 57 |
| FeO | 29.5 to 33.4 |
| $Al_2O_3$ | 1 to 3 |
| $SiO_2$ | 1 to 2 |
| CaO | 0.5 to 1 |

This ore, in the form of a very fine black sand, was briquetted into balls with 5% of a binder formed of pitch and manioc. The metallurgical coke used contained 10% ash. The sodium carbonate was incorporated either into the balls themselves—thereby increasing their cohesion—or else was charged in bulk directly into the furnace.

The hourly output of the furnace was 400 kg. titaneferous slag and 200 kg. cast iron.

In the course of production, the temperature—measured within the shaft 3 metres above the tuyere zone—was 200° to 400° C.; it varied between 800° and 1200° C. at 1 metre above the tuyeres. At the level of the tuyeres, it was 2000° to 2500° C. Decantation in the crucible was effected between 1600° and 1800° C. The material remained 3 to 5 hours within the shaft and 15 to 30 minutes in the hot tuyere zone; the two liquid phases remained 30 minutes to 1 hour in the crucible before being run off.

The titaneferous slag thus produced contained about 80% $TiO_2$, and this content reached 90% after eliminating the soda-containing flux by washing with pure or slightly acid warm water. By way of example, there was obtained a product having the following composition:

|  | Percent |
|---|---|
| $TiO_2$ | 90 |
| $Fe_2O_3$ | 2.0 |
| $Al_2O_3$ | 3.5 |
| $SiO_2$ | 3.5 |
| $Na_2O$ | 0.5 |
| CaO | Traces |
| MgO | Traces |
| Undetermined | 0.5 |

The gas, recovered in the amount of 2.5 to 3.5 m.³ per kilogram of slag, had a calorific power of 1200 to 1400 cal./m.³.

As regards the separated cast iron, it contained about 3% Si and 0.5 to 1% Ti.

It is well understood that the carbon can be introduced in to the reaction mixture in the form of gas-coke, anthracite, wood charcoal, etc. The alkali flux can be in the form of another salt of sodium or potassium, such as chloride, silicate, etc.

I claim:

1. Improvement in the process for treating titaniferous ore containing oxides of titanium and of iron to increase the titanium oxide content thereof, wherein the iron oxides are reduced with carbonaceous material to form cast iron and a slag enriched in titanium oxide, comprising the following steps: subjecting a mixture of the ore and carbonaceous material to prolonged heating within the range of 400° to 1300° C.; thereafter subjecting the heated mixture for a brief period of about 10 to 45 minutes to further heating within the range of 1800°–2500° C. and, finally, heating the mixture within the range of 1300° to less than 1800° C. to cause separation of cast iron and titanium oxide enriched slag, and thereafter recovering the enriched slag.

2. Process according to claim 1, wherein the ore contains impurities other than those of iron, and a carrier gas current is passed through the heated mixture to promote volatilization of said impurities.

3. Process according to claim 1, wherein the mixture is blown with oxygen-enriched air.

4. Process according to claim 1, wherein the heating is carried out in the presence of a flux.

5. Process according to claim 1, wherein the heating is carried out in the presence of a flux containing an alkali metal.

6. Process according to claim 1, wherein the ratio of carbonaceous material present in the initial mixture is sufficient to reduce the iron oxides only.

7. Process according to claim 1, wherein the ratio of carbonaceous material present in the initial mixture is sufficient to reduce the iron oxides and at least partially reduce the titanium oxide.

8. Process according to claim 1, wherein the ratio of carbonaceous material present in the initial mixture is sufficient to reduce the iron and titanium oxides and form titanium carbide.

9. Process according to claim 1, wherein the slag is separated in a fluid state from the liquid cast iron.

10. Process according to claim 8, wherein the slag is separated in a solid state from the liquid cast iron.

11. Process according to claim 1, characterized in that the heating is carried out in a low-stack-blast-furnace comprising a shaft, a belly section, tuyeres and a crucible, and which furnace is blown with oxygen-enriched air, and further characterized in that the prolonged heating of the mixture takes place in the shaft for a period of 3 to 5 hours, the brief heating takes place in the belly section for a period of 15 to 30 minutes, and the final heating takes place in the crucible for a period of 30 minutes to 2 hours.

12. Process for treating a mixture containing oxides of titanium and iron comprising the following steps: adding a carbonaceous reducing agent to said mixture, and passing the resultant mass through a furnace wherein the mass is subjected to a heating cycle comprising successively, an initial progressive heating for a period of 3 to 5 hours to 1300° C., a brief heating to temperatures within the range of 1800°–2200° C. for a period of 15 to 45 minutes, and a final heating to a temperature within the range of 1300° to less than 1800° C. for a period of 30 minutes to 2 hours, thereby forming separate layers of cast iron and slag enriched in titanium oxide, and thereafter recovering said slag.

13. Process for treating a mixture containing oxides of titanium and iron in a low-stack-blast-furnace comprising a shaft, belly section, tuyeres, and a crucible, and blown with oxygen-enriched air, comprising the following steps: adding a carbonaceous reducing agent to said mixture, and passing the resultant mass through the furnace and subjecting it to a heating cycle comprising successively, an initial heating in the shaft to temperatures within the range of 400° to 1200° C. for a period of 3 to 5 hours, a brief heating to temperatures within the range of 2000°–2500° C. for a period of 15 to 30 minutes in the belly section, and a final heating in the crucible to a temperature within the range of 1600°–1800° C. for a period of 30 minutes to 1 hour, thereby forming separate layers of cast iron and slag enriched in titanium oxide and, thereafter, recovering said slag.

References Cited in the file of this patent

UNITED STATES PATENTS

| 995,576 | Sinding-Larsen | June 20, 1911 |
|---|---|---|
| 1,106,408 | Rossi et al. | Aug. 11, 1914 |
| 2,417,101 | Campbell | Mar. 11, 1947 |
| 2,445,377 | Wyckoff | July 21, 1948 |
| 2,537,229 | McLaren | Jan. 9, 1951 |
| 2,631,941 | Cole | Mar. 17, 1953 |
| 2,680,681 | Armant et al. | June 8, 1954 |